United States Patent [19]
Taylor et al.

[11] Patent Number: 5,421,840
[45] Date of Patent: Jun. 6, 1995

[54] PRODUCTION OF SYNTHESIS GAS VIA FLUIDIZED BED/FIXED BED PROCESS COMBINATION

[75] Inventors: James H. Taylor; Geoffrey R. Say, both of Baton Rouge, La.

[73] Assignee: Exxon Research and Engineering Company, Florham Park, N.J.

[21] Appl. No.: 301,206

[22] Filed: Sep. 6, 1994

[51] Int. Cl.$^6$ .............................................. C01B 3/44
[52] U.S. Cl. ................... 48/198.6; 48/197 R; 48/198.7; 212/373
[58] Field of Search ............... 48/198.5, 198.6, 198.7, 48/198.8, 214 A, 215, 197 R, 198.1; 252/373; 423/418.2, 651, 602, 603, 604

[56] References Cited

U.S. PATENT DOCUMENTS

| | | | |
|---|---|---|---|
| 3,523,224 | 3/1921 | Strelzoff et al. | 252/373 |
| 4,877,550 | 10/1989 | Goetsch et al. | 252/373 |
| 5,011,625 | 4/1991 | Le Blanc | 252/373 |
| 5,143,647 | 9/1992 | Say et al. | 252/373 |
| 5,254,316 | 10/1993 | Zardi et al. | 422/148 |

Primary Examiner—Peter Kratz
Attorney, Agent, or Firm—Llewellyn A. Proctor; Jay Simon

[57] ABSTRACT

A mixture of hydrocarbons, oxygen and steam is reacted over a fluidized bed, in a first reaction stage, at high temperature to produce, at hydrocarbon conversion levels ranging from about 85 percent to about 92 percent, a reaction product of hydrogen and carbon monoxide in admixture with unreacted hydrocarbons, carbon dioxide and steam. The level of hydrocarbon conversion is further increased by about 0.5 to 5 percent by contacting and endothermically reacting the reaction product mixture over a fixed bed of a high void fraction catalyst in a second reaction stage.

20 Claims, 1 Drawing Sheet

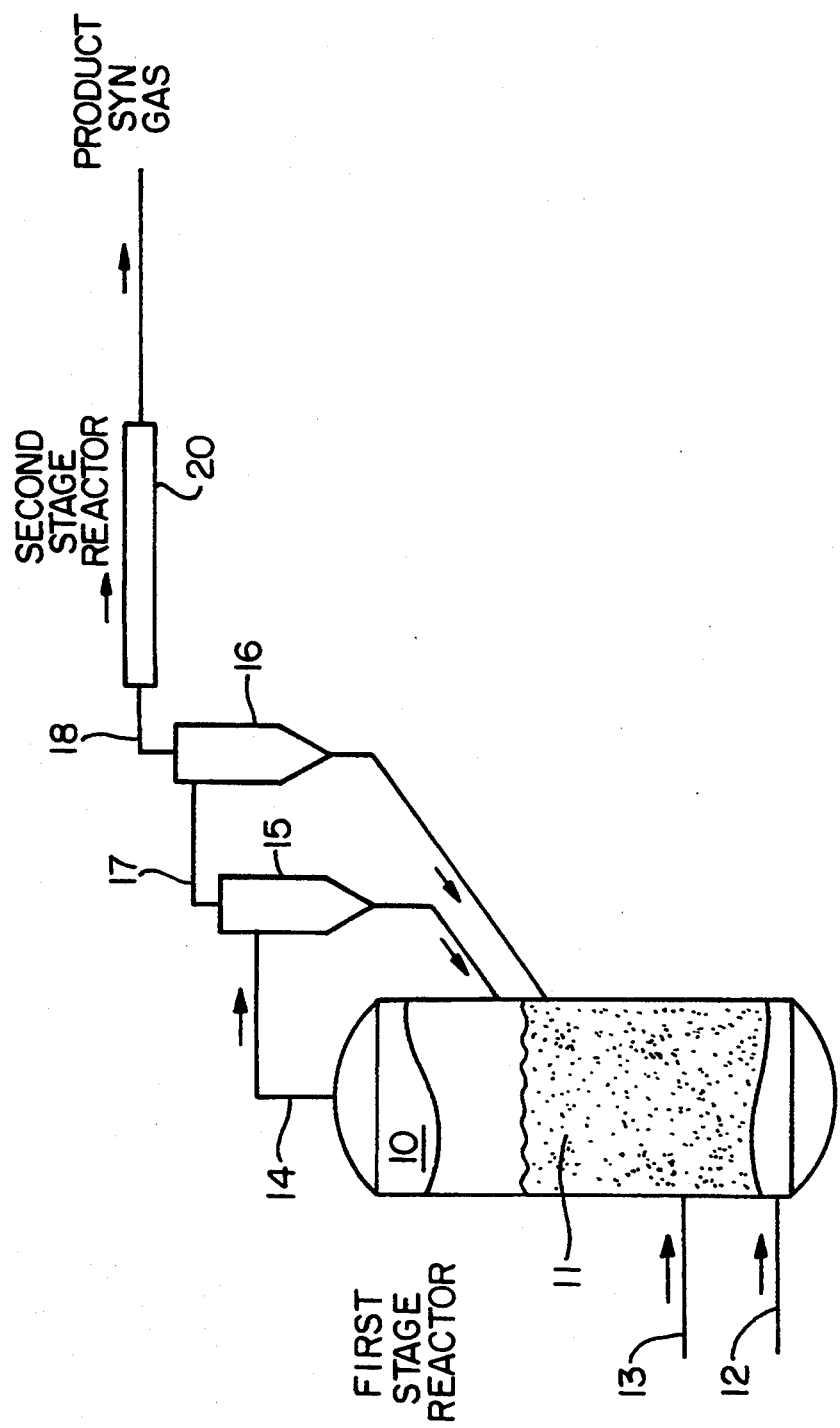

PRODUCTION OF SYNTHESIS GAS VIA FLUIDIZED BED/FIXED BED PROCESS COMBINATION

FIELD OF THE INVENTION

This invention relates to a process which utilizes a fluidized bed/fixed bed combination for the conversion of low molecular weight hydrocarbons to hydrogen and carbon monoxide in the presence or steam and oxygen.

BACKGROUND

Fluid bed processes have been employed for many years, and provide superior heat and mass transfer characteristics as contrasted with fixed bed processes. It is known. e.g., to produce synthesis gas (hydrogen and carbon monoxide) from low molecular weight hydrocarbons, primarily methane, reacted in the presence of steam and oxygen at high temperature within a fluidized bed of catalyst. e.g., nickel-on-alumina, or admixture of catalyst and solids diluents; the diluent being added to better control the heats of reaction. The thermodynamic efficiency of this process is quite high, but nonetheless fails to achieve as high a level of conversion of the hydrocarbons as would be desired due to emulsion phase back-mixing, and the low amount of bubble phase/emulsion phase mass transfer. The gaseous effluent from the fluidized bed reactor, in conducting such reaction, often contains some entrained solids; an effluent readily processed in a fluidized bed reactor though not so in a conventional fixed bed reactor which is all too readily plugged by the solids.

SUMMARY OF THE INVENTION

The invention relates to a fluid bed/fixed bed process combination for the production of syn gas. or hydrogen and carbon monoxide. In a first reaction zone, low molecular weight hydrocarbons, oxygen, and steam are contacted at high temperature in a net reducing atmosphere, with a fluidized bed of catalyst, or mixture of catalyst and a solids diluent, to form a reaction product mixture of hydrogen, carbon monoxide, and unreacted hydrocarbons, steam, and carbon dioxide. In a second reaction zone, the reaction product mixture is contacted as an effluent from said first reaction zone, with a high void fraction fixed bed of catalyst to further convert the unreacted hydrocarbons, steam, and oxygen to hydrogen and carbon monoxide. In the first reaction zone, from about 85 percent to about 92 percent, preferably from about 87 percent to about 90 percent, of the hydrocarbon teed is converted to syn gas, or mixture of hydrogen and carbon monoxide. In the second reaction zone, from about 0.5 percent to about 5 percent additional conversion, preferably from about 1 percent to about 3 percent additional conversion of the hydrocarbons of the reaction mixture to hydrogen and carbon monoxide is obtained. This produces, generally in the series of two reaction zones, a total hydrocarbon conversion level ranging from about 86 percent to about 95 percent, preferably from about 88 percent to about 95 percent, based on the total weight of the hydrocarbons initially fed to the process; a higher level of conversion than possible by the use of a fluidized bed process per se. Overall conversion levels however will depend to some extent on the thermodynamic equilibrium compositions for the steam reforming and water gas shift reactions at reactor temperature and pressure. The pressure drop and plugging effect in the fixed bed portion of the process due to fines carryover from the fluidized bed is minimal due to its very high void fraction.

In a preferred mode of operation, the conversion of the hydrocarbon, oxygen and steam in the first stage reaction zone is conducted by contact of the gaseous reactants with a fluidized bed of the catalyst, e.g., a nickel-on-alumina catalyst, or catalyst and solids diluent, at temperatures ranging from about 1500° F. to about 1900° F., preferably from about 1600° F. to about 1800° F., in a net reducing atmosphere. Pressures range generally from atmospheric to about 40 atmospheres, preferably from about 20 atmospheres to about 40 atmospheres. The reaction product mixture, or effluent from the first stage is passed through the second reaction zone and contacted with a packed bed of the high void fraction catalyst at temperature ranging from about 1500° F. to about 1900° F., preferably from about 1700° F. to about 1800° F., and at pressures ranging from atmospheric to about 40 atmospheres, preferably from about 20 atmospheres to about 40 atmospheres, to increase the total hydrocarbon conversion level by reacting unreacted hydrocarbons and steam to form additional hydrogen and carbon monoxide. In conducting the second stage reaction the catalyst through which the effluent, or reaction product mixture from the first reaction zone, is passed has a void fraction at least about 0.90, preferably from about 0.90 to about 0.98, more preferably from about 0.93 to about 0.98, and the gaseous effluent is passed over the catalyst at a very high rate, providing a residence time in the second reaction zone less than about 1.0 sec. (second), preferably less than about 0.6 sec. More preferably, the residence time ranges from about 0.3 sec. to about 0.6 sec. A preferred catalyst is comprised of nickel, or nickel coated or plated on a metal substrate, suitably nickel coated on a ring type packing material, such as Pall Rings, or on the surface of a suitable honeycomb monolith.

REFERENCE TO THE DRAWING

The FIGURE schematically depicts a preferred process for the practice of this invention. In the FIGURE, the numeral 10 refers to a fluidized bed reactor and the numeral 20 to an in-line fixed bed reactor, as required in the process combination.

DETAILED DESCRIPTION OF THE INVENTION

Referring to the figure, synthesis gas is produced at a conversion level ranging from about 85 percent to about 92 percent, preferably from about 87 percent to about 90 percent, based on the weight of hydrocarbon(s) feed, in reactor 10 which contains a fluidized bed 11 of a catalyst wherein partial oxidation and steam reforming reactions are carried out simultaneously at temperatures ranging from about 1500° F. to about 1900° F., preferably from about 1600° F. to about 1800° F. The fluidized bed preferably also contains a particulate solids diluent to disperse heat, suitably high purity alpha alumina. Generally, the bed is constituted of from about 10 percent to about 99.9 percent, preferably from about 80 percent to about 99.5 percent, of the solid diluents component and front about 0.1 percent to about 90 percent, preferably from about 0.5 percent to about 20 percent, of the catalyst, based on the total weight of the particulate solids constituting the fluidized bed. A mixture of hydrocarbons, e.g. $C_1$–$C_4$ alkanes, predominantly methane, diluted with steam is led into the reactor 10 via line(s) 12, and a mixture of oxygen diluted with steam is led into the reactor 10 via line(s) 13; or the hydrocarbons, oxygen and steam can be ted separately into the reactor 10 via lines not shown. An effluent hydrogen and carbon monoxide product, and carbon dioxide, steam and unconverted hydrocarbons exits overhead via line 14, cyclone separators 15, 16 trapping some of the catalyst particles and fines, returning them via their respective diplegs to the reactor. The product syn gas enters the second stage, or fixed bed reactor 20, through line 18. The mean average diameter of the particles constituting the fluidized bed 11 generally ranges from about 30 microns to about 150 microns, preferably front about 60 microns to about 90 microns. The key fluidization characteristics of the bed 11 are determined by particle size distribution, e.g., bubble size, fluidization regime, and the like as is well known and understood by those skilled in this art.

The catalyst employed in fluidized bed 11 is constituted generally of a refractory inorganic oxide carrier, or support, particularly alumina, and more particularly alpha alumina, composited with a metal, or metals, e.g., iron, nickel, platinum, ruthenium or the like, catalytic for the production of hydrogen and carbon monoxide from low molecular weight hydrocarbons contacted with a fluidized bed of the catalyst at high temperature hydrothermal conditions. Preferably, the catalyst is a nickel-on-alumina catalyst, more preferably a nickel-on-alpha alumina catalyst.

The preferred catalyst contains from about 1 percent to about 20 percent nickel, preferably from about 5 percent to about 20 percent nickel, composited with an alumina, preferably an alpha alumina support.

The total of the gaseous effluent from the first stage reactor 10, after passage through cyclone separators 15, 16, is injected via line 18 into the second stage reactor 20, and contacted with a high void fraction catalyst at temperatures initially ranging from about 1500° F. to about 1900° F., preferably from about 1700° F. to about 1800° F., sufficient without additional heat to convert unreacted hydrocarbons in the effluent to hydrogen and carbon monoxide and increase the total conversion level by about 0.5 percent to about 5 percent, preferably from about 1 percent to about 3 percent, above the level of hydrocarbon conversion obtained in reactor 10. Typically, e.g., when from about 8 to 13 percent unreacted hydrocarbons are contained within an effluent from reactor 10, the level of unreacted hydrocarbons contained in the syn gas product of reactor 20 can be reduced to a level of about 5 percent to about 11 percent, as contrasted with the weight of hydrocarbons introduced into reactor 10 via line 12.

The second stage reactor 20 is preferably an in-line reactor, or reactor constituted of the piping which directs the first stage gas to its ultimate destination. The section of piping contains a high void fraction material, e.g. wire mesh, metal gauze ring type packing materials, e.g. raschig rings, saddles, Pall Rings, wire helices, wire rings, ceramic honeycomb monolith, or other inorganic refractory materials or the like which are constituted of, or coated with a catalytic metal for the conversion of hydrocarbons, and steam to hydrogen and carbon monoxide, e.g. iron, nickel, platinum, ruthenium, or the like. Sufficient catalytic surface area is provided in order to achieve the additional 0.5 to 5 percent conversion with a residence time of about 0.3 to 0.6 sec. The amount of conversion in the fixed bed is limited to from about 0.5 percent to about 5 percent due to the endothermic nature of the steam reforming reaction. As the reaction proceeds, the temperature decreases and the reaction rate decreases.

A preferred metal for use in the second, or fixed bed reactor is nickel. The catatlyst can be constituted wholly of nickel, e.g. a nickel Pall Ring, nickel helice, or nickel ring; or metallic nickel can be plated or coated upon a substrate provided by a support of the desired shape. A catalyst providing a nickel surface area ranging from about 0.2 meters square per pound mole per hour ($m^2$/lb-mole/hr) of synthesis gas to about 4.0 $m^2$/lb-mole/hr of synthesis gas, preferably from about 0.6 $m^2$/lb-mole/hr to about 1.7 $m^2$/lb-mole/hr of synthesis gas is generally adequate to provide the desired rate of reaction.

The invention, and its principal of operation, will be better understood by reference to the following example which illustrates specific and preferred embodiments.

EXAMPLE

A fluid bed, first stage reactor of a series is charged with a 0.3 wt. % nickel-on-alpha alumina catalyst, while the second reactor of the series is provided with a fixed bed of nickel coated Pall Rings as identified in the Table. The reactors are brought to operating temperature and pressure and then a mixture of steam and natural gas, and oxygen is injected into the first stage reactor of the series; the product gas from the first stage reactor being injected into the second stage reactor, or final reactor of the series.

The Table shows that the overall conversion is increased by an additional 2% (i.e. 87% to 89%) by utilization of the small second stage fixed bed reactor downstream of the main fluid bed reactor. $CH_4$ conversion is increased from 87% to 89% by simply using the small high void fraction fixed bed reactor containing a catalyst constituted of nickel Pall Rings.

TABLE

|  | First Stage Reactor | Second Stage Reactor |
| --- | --- | --- |
| Type Bed | Fluid Bed | Fixed Bed |
| Temp, ° F. | 1800 | 1780 |
| Pressure, psia | 350 | 350 |
| Residence Time, sec. | 12 | 0.5 |
| Catalyst | 0.3 wt. % Ni on $\alpha$-$Al_2O_3$ | Pall Rings |
| Square meters of nickel coated material per lb-mole/hr of syn gas | — | 1.1 |
| Void Fraction | — | 0.975 |
| Total $CH_4$ Conv., % | 87 | 89 |

It is apparent that various modifications and changes can be made without departing the spirit and scope of the invention.

Having described the invention, what is claimed is:

1. In a process for the production of hydrogen and carbon monoxide, the steps comprising contacting, in a first reaction zone, low molecular weight hydrocarbons comprising methane, oxygen, and steam, at high temperature in a net reducing atmosphere, with a fluidized bed of catalyst, or catalyst and a solids diluent, to convert from about 85 percent to about 92 percent of the hydrocarbons to hydrogen and carbon monoxide and form a reaction mixture of hydrogen, carbon monoxide and unreacted hydrocarbons, oxygen and steam, withdrawing said reaction mixture as an effluent from said first reaction zone, and contacting said effluent, in a second reaction zone, with a fixed bed of catalytic metal solids with a void fraction of at least about 0.9 to convert, sufficient of the unreacted hydrocarbons, oxygen, and steam and increase the hydrocarbon conversion to a level ranging from about 0.5 percent to about 5 percent above that obtained in said first reaction zone.

2. The process of claim 1 wherein, in the second reaction zone, sufficient of the unreacted hydrocarbons are converted to hydrogen and carbon monoxide to increase the hydrocarbon conversion to a level ranging from about 1 percent to about 3 percent above that of said first reaction zone.

3. The process of claim 1 wherein in the first conversion zone from about 87 percent to about 90 percent of the hydrocarbon feed is converted to hydrogen and carbon monoxide.

4. The process of claim 1 wherein in the first conversion zone from about 87 percent to about 90 percent of the hydrocarbon feed is converted to hydrogen and carbon monoxide, and in the second reaction zone, sufficient of the unreacted hydrocarbons are converted to hydrogen and carbon monoxide to increase the hydrocarbon conversion to a level ranging from about 1 percent to about 3 percent above that of said first reaction zone.

5. The process of claim 1 wherein, in the first reaction zone, the reaction is conducted at temperatures ranging from about 1500° F. to about 1900° F. over a nickel-on-alumina catalyst, the effluent introduced initially into the second reaction zone ranges from about 1500° F. to about 1900° F., the fixed bed of catalytic solids contained in the second reaction zone has a void fraction at least about 0.9 and the residence time of the effluent in said second reaction zone is less than about 1 second.

6. The process of claim 5 wherein in the temperature of the first reaction zone and effluent initially introduced into said second reaction zone ranges from about 1600° F. to about 1800° F., and, in the second reaction zone, the fixed bed of catalytic solids has a void fraction ranging from about 0.90 to about 0.98, and the effluent has a residence time of less than about 0.6 second.

7. The process of claim 6 wherein the residence time of the effluent within the second reaction zone ranges from about 0.3 second to about 0.6 second.

8. The process of claim 1 wherein the catalyst of the first reaction zone is comprised of nickel-on-alumina, and the catalyst of the second reaction zone is comprised of nickel.

9. The process of claim 8 wherein the surface area of the nickel contained on the catalyst of the second reaction zone ranges from about 0.2 m$^2$/lb-mole/hr to about 4.0 m$^2$/lb-mole/hr of synthesis gas.

10. The process of claim 9 wherein the surface area of the nickel ranges from about 0.6 m$^2$/lb-mole/hr to about 1.7 m$^2$/lb-mole/hr of synthesis gas.

11. The process of claim 9 wherein the catalyst is nickel coated Pall Rings, or nickel deposited on a ceramic honeycomb monolith.

12. The process of claim 1 wherein the total conversion of the low molecular weight hydrocarbon feed obtained by reaction in both the first and second reaction zones ranges from about 86 percent to about 95 percent, based on the total weight of hydrocarbon feed initially fed to the process.

13. The process of claim 12 wherein the total conversion of the low molecular weight hydrocarbon feed ranges from about 88 to about 95 percent.

14. In a process for the production of hydrogen and carbon monoxide, the steps comprising contacting, in a first reaction zone, low molecular weight hydrocarbons, comprising methane oxygen, and steam, at temperature ranging from about 1500° F. to about 1900° F. in a net reducing atmosphere, with a fluidized bed of catalyst, or catalyst and a solids diluent, to convert from about 85 percent to about 92 percent of the hydrocarbons to hydrogen and carbon monoxide and form a reaction mixture of hydrogen, carbon monoxide and unreacted hydrocarbons, oxygen and steam, withdrawing said reaction mixture as an effluent from said first reaction zone, and contacting said effluent, in a second reaction zone, with a fixed bed of catalytic metal solids having a void fraction at least about 0.9, and providing an effluent residence time in said second reaction zone less than about 1 second to convert the unreacted hydrocarbons, oxygen, and steam and increase the hydrocarbon conversion to a level ranging from about 0.5 percent to about 5 percent above that of said first reaction zone.

15. The process of claim 14 wherein, in the second reaction zone, sufficient of the unreacted hydrocarbons are converted to hydrogen and carbon monoxide to increase the hydrocarbon conversion to a level ranging from about 1 percent to about 3 percent above that of said first reaction zone.

16. The process of claim 14 wherein in the first conversion zone from about 87 percent to about 90 percent of the hydrocarbon feed is converted to hydrogen and carbon monoxide.

17. The process of claim 14 wherein in the first conversion zone from about 87 percent to about 90 percent of the hydrocarbon feed is converted to hydrogen and carbon monoxide, and in the second reaction zone, sufficient of the unreacted hydrocarbons are converted to hydrogen and carbon monoxide to increase the hydrocarbon conversion to a level ranging from about 1 percent to about 3 percent above that of said first reaction zone.

18. The process of claim 14 wherein, in the first reaction zone, the reaction is conducted over a nickel-on-alumina catalyst, the effluent introduced initially into the second reaction zone ranges from about 1700° F. to about 1800° F., the fixed bed of catalytic solids contained in the second reaction zone has a void fraction ranges from about 0.90 to about 0.98, and the residence time of the effluent in said second reaction zone is less than about 0.6 second.

19. The process of claim 18 wherein in the second reaction zone, the fixed bed of catalytic solids has a void fraction ranging from about 0.93 to about 0.98.

20. The process of claim 19 wherein the residence time of the effluent within the second reaction zone ranges from about 0.3 second to about 0.6 second.

* * * * *